G. A. TYLER.
WHEELBARROW.
APPLICATION FILED MAY 17, 1912.

1,070,308.

Patented Aug. 12, 1913.

Witnesses

Inventor
G. A. Tyler
By Victor J. Evans
Attorney

UNITED STATES PATENT OFFICE.

GEORGE A. TYLER, OF EL PASO, TEXAS.

WHEELBARROW.

1,070,308.  Specification of Letters Patent.  Patented Aug. 12, 1913.

Application filed May 17, 1912. Serial No. 697,949.

*To all whom it may concern:*

Be it known that I, GEORGE A. TYLER, a citizen of the United States, residing at El Paso, in the county of El Paso and State of Texas, have invented new and useful Improvements in Wheelbarrows, of which the following is a specification.

This invention is an improved self-dumping wheel barrow especially adapted for use for wheeling concrete and also adapted for use for wheeling sand and other material, the object of the invention being to provide a wheel barrow of improved and novel construction which embodies a pivotally mounted bottom dumping door, means for securing the door in closed position and means for releasing said door.

The invention consists in the construction, combination and arrangement of devices, hereinafter described and claimed.

Figure 1:
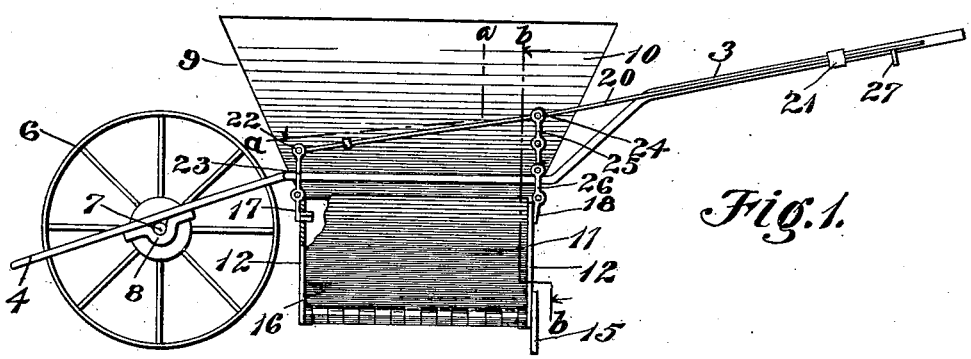
Figure 2:
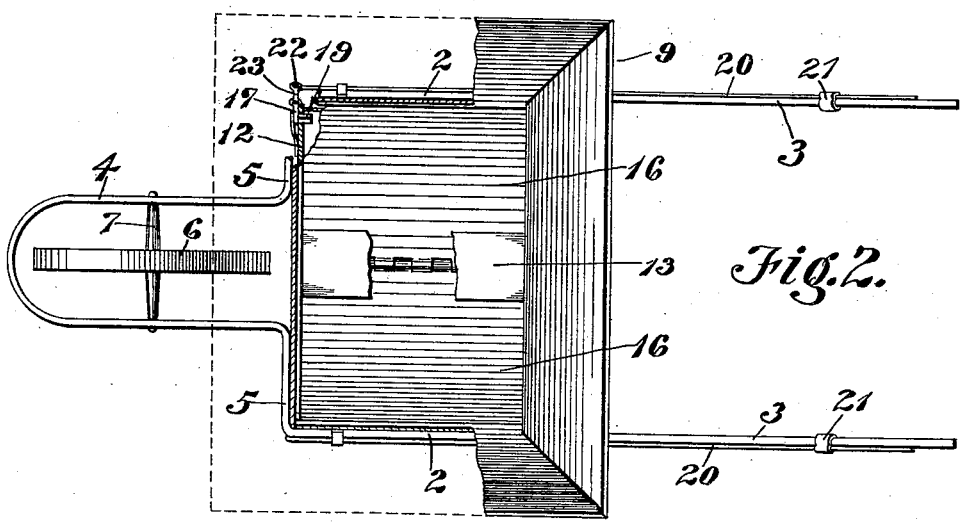
Figure 3:
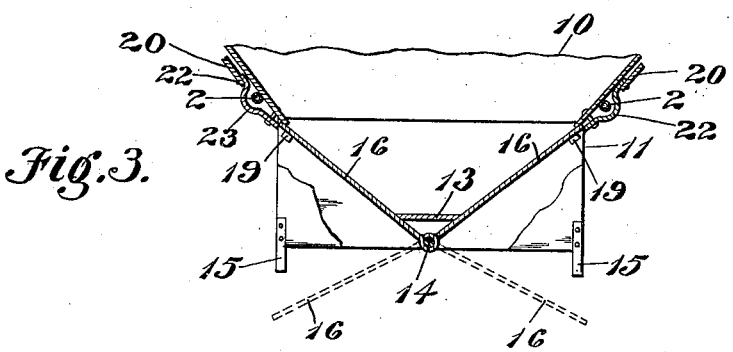

In the accompanying drawing: Figure 1 is a side elevation of a self-dumping wheel barrow constructed in accordance with my invention. Fig. 2 is partly a plan and partly a horizontal sectional view of the same on the plane indicated by the line $b-b$ of Fig. 1. Fig. 3 is partly a rear elevation of the same and partly a vertical section on the plane indicated by the line $a-a$ of Fig. 1.

The frame 1 of my improved wheel barrow is made of a single metal bar or tube and comprises a pair of parallel side arms 2, upwardly and rearwardly inclined handles 3 which are formed with and extend rearwardly from the said side arms, a forwardly extending medially arranged substantial U-shaped yoke 4 and transversely arranged alined connecting bars or arms 5 which connect the rear ends of the arms of the yoke to the front ends of the side arms 2. The wheel 6 is arranged midway between the arms of the yoke and its axle 7 is mounted in bearings 8 secured to the under side of the yoke. The body 9 of the barrow is preferably made of sheet metal, is rectangular in plan and comprises a hopper shaped enlarged upper portion 10 and a vertical sided smaller lower portion 11, the front and rear side walls 12 of which are fixed. A bottom 13 is arranged centrally and connects the lower ends of the front and rear walls 12. Said walls are also here shown as connected together by a rod 14 which is arranged under the center of the bottom plate. This body is arranged between the arms 2 of the frame, the lower portions of the inclined sides of the upper part of the body bearing against and being secured to the said arms. The rear wall 12 is provided at its lower corners with a pair of downwardly extending supporting feet or standards 15 which bear on the ground when the wheel barrow is lowered, so that its weight is supported by the wheel and also by the said feet or standards.

The bottom of the body is formed by a pair of doors or plates 16 which are pivotally or hingedly connected to the rod 14 and are adapted to close upwardly and to open downwardly. On the outer sides of the front and rear walls 12 are spring catches 17—18, respectively, which have cam hooks 19 that project through openings in the said walls and engage the bottom doors or plates 15 when the latter are in raised closed position and, hence, serve to secure the said bottom doors in such position. On opposite sides of the frame of the wheel barrow are operating rods 20. The said rods move in suitable guides 21 on the handles 3. Each of the said operating rods is pivotally connected at its front end as at 22 to the upper end of a pivotally mounted trip rod 23 which is connected to one of the front catches 17. Each operating rod is also connected as at 24 to a pivotally mounted link rod 25, the lower end of the said link rods being pivotally connected to a trip rod 26 which is connected to one of the rear catches 18. Each operating rod has a trip lever or handle 27.

In order to dump a load from a wheel barrow, it is only necessary to draw one of the operating rods rearwardly so as to cause it, through the instrumentality of the trip rods hereinbefore described, to release the catches from one of the bottom doors 16 and thereupon the said bottom door by the weight of the load drops downwardly to an inclined position and coacts with the other door to form a chute to discharge the load by gravity from one side of the wheel barrow, as will be understood.

While I have herein shown and described a preferred form of my invention, I would have it understood that changes may be made in the form, proportion and construction of the several parts without departing from the spirit of my invention and within the scope of the appended claim.

I claim:—

A wheel barrow having a body comprising a hopper shaped upper portion and vertical front and rear walls depending from the front and rear sides of said upper portion, a medially arranged rod connecting the lower portions of said front and rear walls, oppositely inclined bottom doors hingedly mounted at their lower sides on the said rod between said front and rear walls and arranged to be closed upwardly against the sides of the upper portion of the hopper, catches to secure the said bottom doors in raised position, the said catches being pivotally mounted on the said body, a frame on which the body is secured having rearwardly extending handles, guides on the said handles and operating rods for the catches guided in the said guides.

In testimony whereof I affix my signature in presence of two witnesses.

GEORGE A. TYLER.

Witnesses:
 TRACEY REDMOND,
 JOHN T. FLETCHER.

Copies of this patent may be obtained for five cents each, by addressing the "Commissioner of Patents, Washington, D. C."